US011078107B2

(12) United States Patent
Kim et al.

(10) Patent No.: US 11,078,107 B2
(45) Date of Patent: Aug. 3, 2021

(54) EXTERIOR MATERIAL OF HOME APPLIANCE, HOME APPLIANCE INCLUDING THE EXTERIOR MATERIAL, AND MANUFACTURING METHOD THEREOF

(71) Applicant: Samsung Electronics Co., Ltd., Suwon-si (KR)

(72) Inventors: Kyoung Mok Kim, Yongin-si (KR); Seulkiro Kim, Suwon-si (KR); Yu Jeong Oh, Suwon-si (KR); Jong Ho Lee, Yongin-si (KR); Jung Soo Lim, Hwaseong-si (KR); Ki Hwan Kwon, Hwaseong-si (KR); Yong Jong Park, Seongnam-si (KR); Hyun Sang Yoo, Suwon-si (KR); Boo-Keun Yoon, Yongin-si (KR); Hee Tae Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 16/123,623

(22) Filed: Sep. 6, 2018

(65) Prior Publication Data
US 2019/0071347 A1 Mar. 7, 2019

(30) Foreign Application Priority Data
Sep. 6, 2017 (KR) .......................... 10-2017-0113780

(51) Int. Cl.
*C03C 8/08* (2006.01)
*C23D 13/00* (2006.01)
(Continued)

(52) U.S. Cl.
CPC ............. *C03C 8/08* (2013.01); *A47J 31/4403* (2013.01); *A47J 37/0623* (2013.01);
(Continued)

(58) Field of Classification Search
CPC .......... C03C 8/08; C03C 3/068; C03C 3/095; C03C 8/14; C03C 2207/00; C03C 3/062;
(Continued)

(56) References Cited

U.S. PATENT DOCUMENTS 2,436,825 A * 3/1948 Prior .......................... C03C 4/00
501/14
RE29,388 E * 9/1977 Atkinson ................... C03C 3/04
501/38
(Continued)

FOREIGN PATENT DOCUMENTS

DE 4200237 A1 * 7/1993 ............... C03C 8/02
EP 1006088 A1 * 6/2000 ............. C03C 17/04
(Continued)

OTHER PUBLICATIONS

International Application search report dated Jan. 11, 2019; International Application #: PCT/KR2018/010397.

*Primary Examiner* — Jimmy Chou
(74) *Attorney, Agent, or Firm* — Jefferson IP Law, LLP

(57) ABSTRACT

A cooking apparatus including an enamel coating layer having an improved cleaning efficiency and a manufacturing method therefor are provided. The cooking apparatus includes a cooking compartment configured to accommodate a cooking object, a door configured to open and close the cooking compartment, and an enamel coating layer provided on a surface of the cooking compartment. The enamel coating layer includes, in percent (%) by weight of the entire composition, 5% or less (excluding 0%) of a silicon dioxide ($SiO_2$), 10% to 20% of an aluminum oxide ($Al_2O_3$), 10% to 20% of a phosphorous pentoxide ($P_2O_5$), 5% to 15% of a rare earth oxide, and 5% to 10% of a ferric oxide ($Fe_2O_3$).

20 Claims, 10 Drawing Sheets

(51) Int. Cl.
*C23D 5/02* (2006.01)
*C03C 3/068* (2006.01)
*A47J 31/44* (2006.01)
*A47J 37/06* (2006.01)
*C23D 5/04* (2006.01)
*C03C 8/14* (2006.01)
*C03C 3/095* (2006.01)
*F24C 15/00* (2006.01)
*A47J 36/02* (2006.01)
*C23D 1/00* (2006.01)

(52) U.S. Cl.
CPC .............. *C03C 3/068* (2013.01); *C03C 3/095* (2013.01); *C03C 8/14* (2013.01); *C23D 5/02* (2013.01); *C23D 5/04* (2013.01); *C23D 13/00* (2013.01); *F24C 15/005* (2013.01); *A47J 36/02* (2013.01); *C03C 2207/00* (2013.01); *C23D 1/00* (2013.01)

(58) Field of Classification Search
CPC .... A47J 31/4403; A47J 37/0623; A47J 36/02; C23D 5/02; C23D 5/04; C23D 13/00; C23D 1/00; F24C 15/005
USPC .......... 501/2, 4, 14, 16, 17, 24, 45; 99/324; 428/325, 426, 432
See application file for complete search history.

(56) References Cited

U.S. PATENT DOCUMENTS

| | | | | |
|---|---|---|---|---|
| 4,520,115 A * | 5/1985 | Speit | ........................ | C03C 3/07 252/478 |
| 4,537,862 A * | 8/1985 | Francel | ................... | C03C 3/068 501/14 |
| 4,990,750 A * | 2/1991 | Martel | ................... | F24C 15/105 219/445.1 |
| 5,077,133 A * | 12/1991 | Cheng | ..................... | C03C 4/082 428/426 |
| 5,357,079 A * | 10/1994 | Henry | ..................... | F24C 7/083 126/211 |
| 5,382,552 A | 1/1995 | Saad et al. | | |
| 5,614,330 A * | 3/1997 | Panzera | .................. | C04B 33/24 428/697 |
| 5,700,579 A * | 12/1997 | Jeanvoine | ......... | B32B 17/10036 428/437 |
| 5,998,037 A * | 12/1999 | Sridharan | ............... | C03C 3/064 427/126.4 |
| 6,004,894 A * | 12/1999 | Faust | ........................ | C03C 8/02 501/16 |
| 6,048,812 A * | 4/2000 | Brocheton | .............. | C03C 3/112 501/57 |
| 6,087,282 A * | 7/2000 | Panzera | .................... | C03C 8/08 501/21 |
| 6,429,161 B1 * | 8/2002 | Souchard | .................. | C03C 8/02 501/17 |
| 6,506,700 B1 * | 1/2003 | Combes | .................. | C03C 4/085 501/70 |
| 6,727,198 B1 * | 4/2004 | Hashimoto | ............. | C03C 3/085 501/66 |
| 6,896,934 B2 * | 5/2005 | Aronica | ................... | C03C 3/066 204/489 |
| 7,026,753 B2 * | 4/2006 | Futagami | ............... | C03C 3/095 313/493 |
| 7,076,324 B2 * | 7/2006 | Harkcom | ............... | G05B 19/104 126/20 |
| 7,091,141 B2 * | 8/2006 | Horsfall | ................... | C03C 3/085 428/426 |
| 7,220,690 B2 * | 5/2007 | Mitra | .................. | C03C 10/0027 501/4 |
| 7,268,093 B2 * | 9/2007 | Ishiki | ........................ | C03C 8/02 501/17 |
| 7,671,303 B2 * | 3/2010 | Vilato | ..................... | C03C 17/04 219/443.1 |
| 7,687,419 B2 * | 3/2010 | Kawai | ..................... | C03C 3/095 501/64 |
| 7,763,557 B2 * | 7/2010 | Baldwin | .................. | C03C 8/22 501/14 |
| 7,820,575 B2 * | 10/2010 | Nagashima | ............... | C03C 4/02 501/64 |
| 7,964,294 B2 * | 6/2011 | Venkataramani | ....... | C03C 3/112 428/697 |
| 8,410,404 B2 * | 4/2013 | Baek | ...................... | C03C 3/066 219/385 |
| 8,664,131 B2 * | 3/2014 | Beall | ....................... | C03B 20/00 501/7 |
| 9,249,045 B2 * | 2/2016 | Gabel | ................. | C03C 10/0036 |
| 9,927,130 B2 * | 3/2018 | Ortmann | ................. | F24C 15/10 |
| 10,219,328 B2 * | 2/2019 | Comte | ..................... | H05B 3/74 |
| 10,427,976 B2 * | 10/2019 | Barkai | ..................... | F24S 80/52 |
| 10,647,609 B2 * | 5/2020 | Choi | ....................... | F27D 1/0003 |
| 10,794,600 B2 * | 10/2020 | Charpentier | ............ | G05B 15/02 |
| 10,836,673 B2 * | 11/2020 | Kim | ....................... | C03B 27/028 |
| 2003/0064874 A1 * | 4/2003 | Eckmann | .................. | C03C 8/02 501/21 |
| 2003/0141295 A1 * | 7/2003 | Ishikawa | .................. | H05B 6/688 219/697 |
| 2004/0014586 A1 * | 1/2004 | Otaki | ...................... | C03C 13/00 501/35 |
| 2005/0143246 A1 * | 6/2005 | Comte | ................. | C03C 10/0009 501/4 |
| 2005/0224491 A1 * | 10/2005 | Vilato | ..................... | C03C 17/04 219/443.1 |
| 2007/0129231 A1 * | 6/2007 | Comte | ................. | C03C 10/0027 501/4 |
| 2007/0221655 A1 * | 9/2007 | Bridgwater | .......... | A47J 37/0871 219/494 |
| 2007/0232476 A1 * | 10/2007 | Siebers | .................... | C03C 3/095 501/4 |
| 2009/0009063 A1 * | 1/2009 | Botelho | ................ | C03C 27/06 313/504 |
| 2009/0311514 A1 * | 12/2009 | Shon | ...................... | F24C 15/005 428/325 |
| 2010/0160139 A1 * | 6/2010 | McGinnis | ............... | C03C 3/091 501/38 |
| 2010/0160140 A1 * | 6/2010 | McGinnis | ............... | C03C 3/085 501/38 |
| 2010/0183737 A1 * | 7/2010 | Fujiwara | .................. | A61Q 1/02 424/613 |
| 2011/0049122 A1 * | 3/2011 | Baek | ...................... | F24C 15/005 219/385 |
| 2011/0086241 A1 * | 4/2011 | Hachitani | ............... | G11B 5/73921 428/846.9 |
| 2011/0114620 A1 * | 5/2011 | Lommel | ................. | F24C 7/082 219/209 |
| 2011/0129679 A1 * | 6/2011 | Svetlana | ................... | C03C 8/14 428/433 |
| 2011/0146776 A1 * | 6/2011 | Carroll | ..................... | H01B 1/16 136/256 |
| 2011/0226231 A1 * | 9/2011 | Siebers | .................... | C03C 3/087 126/211 |
| 2011/0272396 A1 * | 11/2011 | Bunuel Magdalena | ..................... | C04B 41/52 219/622 |
| 2012/0263957 A1 * | 10/2012 | Chopinet | .................. | C03C 8/02 428/428 |
| 2012/0305544 A1 * | 12/2012 | Oagley | .................. | H05B 6/1263 219/622 |
| 2012/0308667 A1 * | 12/2012 | Melson | ..................... | A61K 8/25 424/642 |
| 2013/0149433 A1 * | 6/2013 | Ehrt | .................. | C04B 35/62665 427/2.29 |
| 2013/0225389 A1 * | 8/2013 | Dick | ........................ | C03C 1/004 501/66 |
| 2013/0274085 A1 * | 10/2013 | Beall | ....................... | C03C 14/00 501/32 |
| 2013/0286630 A1 * | 10/2013 | Guiset | ..................... | F21V 19/00 362/23.1 |

(56) References Cited

U.S. PATENT DOCUMENTS

| | | | | |
|---|---|---|---|---|
| 2013/0299482 A1* | 11/2013 | Kim | ............... | C03C 8/20 219/391 |
| 2013/0299483 A1* | 11/2013 | Kim | ............... | C03C 8/08 219/391 |
| 2013/0302618 A1* | 11/2013 | Kuhnemann | ........ | C03C 3/087 428/410 |
| 2014/0174126 A1* | 6/2014 | Binhussain | ........ | C03C 8/02 65/21.5 |
| 2014/0272748 A1* | 9/2014 | Uibel | ........ | C23C 18/1275 432/265 |
| 2014/0274653 A1* | 9/2014 | Duan | ........ | C03C 3/062 501/64 |
| 2015/0111717 A1* | 4/2015 | Gabel | ........ | C03C 3/097 501/32 |
| 2016/0116155 A1* | 4/2016 | Bach | ........ | F24C 7/082 362/23.1 |
| 2016/0159694 A1* | 6/2016 | Chamberlain | ........ | C04B 35/806 501/88 |
| 2016/0251258 A1* | 9/2016 | Yang | ........ | C03C 3/19 501/15 |
| 2018/0179101 A1* | 6/2018 | Duman | ........ | C03C 8/02 |
| 2019/0169065 A1* | 6/2019 | Choi | ........ | F27D 1/0003 |
| 2020/0299183 A1* | 9/2020 | Mannheim Astete | .... | C03C 8/16 |

FOREIGN PATENT DOCUMENTS

| | | | | |
|---|---|---|---|---|
| FR | 2902420 A1 | * | 12/2007 | ......... C03C 10/0027 |
| JP | 2000247730 A | * | 9/2000 | ............. C03C 3/068 |
| JP | 5300557 B2 | | 9/2013 | |
| KR | 10-2011-0007005 A | | 1/2011 | |
| KR | 10-2011-0007030 A | | 1/2011 | |
| KR | 10-2011-0023079 A | | 3/2011 | |
| KR | 10-1411034 B1 | | 6/2014 | |
| KR | 10-2014-0138733 A | | 12/2014 | |
| KR | 10-1476500 B1 | | 12/2014 | |
| WO | WO-0172651 A1 | * | 10/2001 | ............... C09D 1/02 |

* cited by examiner

EXTERIOR MATERIAL OF HOME APPLIANCE, HOME APPLIANCE INCLUDING THE EXTERIOR MATERIAL, AND MANUFACTURING METHOD THEREOF

CROSS-REFERENCE TO RELATED APPLICATION(S)

This application is based on and claims priority under 35 U.S.C. § 119 of a Korean patent application number 10-2017-0113780, filed on Sep. 6, 2017, in the Korean Intellectual Property Office, the disclosure of which is incorporated by reference herein its entirety.

BACKGROUND

1. Field

The disclosure relates to an exterior material of a home appliance, a home appliance including the exterior material, and a manufacturing method thereof. More particularly, the disclosure relates to an exterior material of a home appliance having a corrosion resistance and fingerprint resistance improved by changing the surface treatment method of the exterior material, a home appliance including the exterior material, and a manufacturing method thereof.

2. Description of Related Art

In recent years, stainless steel may be used as an exterior material for home appliances, and when a diamond like carbon (DLC) coating is used on stainless steel, damage may occur in the manufacturing process, such as a pressing, a bending, a cutting, and the like. When such damage contacts a high concentration of chlorine ions, partial dissolution is initiated and chlorine complex ions accumulated in a cavity formed by the dissolution may cause hydrolysis, thereby lowering pH in the cavity and activating corrosion. In addition, when the DLC coating is used on the exterior material of home appliances, it is difficult to remove contaminants, such as fingerprints, oil, and dirt, so that the surface of the exterior material of the home appliance may be easily stained.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a cooking apparatus including an enamel coating layer having less surface oxide groups after coating and firing.

Another aspect of the disclosure is to provide an exterior material of a home appliance having an improved corrosion resistance and fingerprint resistance, a home appliance including the same, and a manufacturing method thereof.

Additional aspects of the will be set forth in part in the description which follows and, in part, will be obvious from the description, or may be learned by practice of the presented embodiments.

In accordance with an aspect of the disclosure, a cooking apparatus is provided. The cooking apparatus includes a cooking compartment configured to accommodate a cooking object, a door configured to open and close the cooking compartment, and an enamel coating layer provided on a surface of the cooking compartment. wherein, the enamel coating layer includes, in percent (%) by weight of the entire composition, 5% or less (excluding 0%) of a silicon dioxide ($SiO_2$), 10% to 20% of an aluminum oxide ($Al_2O_3$), 10% to 20% of a phosphorous pentoxide ($P_2O_5$), 5% to 15% of a rare earth oxide, and 5% to 10% of a ferric oxide ($Fe_2O_3$).

The enamel coating layer may include the aluminum oxide ($Al_2O_3$) in an aluminum oxide ($Al_2O_3$)-to-phosphorous pentoxide ($P_2O_5$) ratio of 0.5 to 1:1 by weight.

The enamel coating layer may include the ferric oxide (v) in a ferric oxide ($Fe_2O_3$)-to-aluminum oxide ($Al_2O_3$) ratio of 0.5 to 1:1 by weight.

The enamel coating layer may include the rare earth oxide in a rare earth oxide-to-phosphorous pentoxide ($P_2O_5$) ratio of 0.3 to 1:1 by weight.

The rare earth oxide may be selected from the group consisting of a cerium oxide ($CeO_2$), a lanthanum oxide ($La_2O_3$), and a samarium oxide ($Sm_2O_3$).

The enamel coating layer may further include a binder selected from the group consisting of a cobalt oxide (CoO), a nickel oxide (NiO), a tin oxide (SnO), and a copper oxide (CuO).

The enamel coating layer may further include an alkali metal oxide or an alkaline earth metal oxide.

The cooking apparatus may further include an intermediate coating layer provided between the cooking compartment and the enamel coating layer, wherein the intermediate coating layer further includes a silicon dioxide ($SiO_2$) and a boron trioxide ($B_2O_3$) in a total content of 10% or more and 80% or less by weight.

The intermediate coating layer may have a thickness equal or smaller than a thickness of the enamel coating layer.

In accordance with another aspect of the disclosure, a method of manufacturing a cooking apparatus is provided. The method includes preparing a cooking compartment, forming an enamel coating layer on a surface of the cooking compartment, and heating the cooking compartment having the enamel coating layer at a temperature of 800° C. to 1000° C., wherein the enamel coating layer includes, in percent (%) by weight of the entire composition, 5% or less (excluding 0%) of a silicon dioxide ($SiO_2$), 10% to 20% of an aluminum oxide ($Al_2O_3$), 10% to 20% of a phosphorous pentoxide ($P_2O_5$), 5% to 15% of a rare earth oxide, and 5% to 10% of a ferric oxide ($Fe_2O_3$).

The method may further include performing an etching process on the prepared cooking compartment.

The etching process may be performed using nitric acid at a concentration of 20 g/L to 300 g/L.

The method may further include performing a sand blast process on the prepared cooking compartment.

The method may further include performing a manganese phosphate process on the prepared cooking compartment.

The method may further include, after the preparing of the cooking compartment, preparing an intermediate coating layer on a surface of the cooking compartment, wherein the intermediate coating layer includes a silicon dioxide ($SiO_2$) and a boron trioxide ($B_2O_3$) in a total content of 10% or more and 80% or less by weight.

The method may further include, after the forming of the intermediate coating layer, drying the intermediate coating layer.

The forming of the intermediate coating layer may include forming the intermediate coating having a thickness equal or smaller than a thickness of the enamel coating layer.

The method may further include, after the forming of the intermediate coating layer, heating the intermediate coating layer at a temperature of 800° C. to 900° C.

In accordance of the disclosure, he preparing of the intermediate coating layer may include forming the intermediate coating having a thickness equal or smaller than a thickness of the enamel coating layer.

In accordance with another aspect of the disclosure, an enamel composition is provided. The enamel composition includes, in percent (%) by weight of the entire composition, 5% or less (excluding 0%) of a silicon dioxide ($SiO_2$), 10% to 20% of an aluminum oxide ($Al_2O_3$), 10% to 20% of a phosphorous pentoxide ($P_2O_5$), 5% to 15% of a rare earth oxide, and 5% to 10% of a ferric oxide ($Fe_2O_3$).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure may be applied to all types of cooking apparatuses including an enamel coating layer. The cooking apparatus is a concept including an apparatus capable of cooking a cooking object by heating the cooking object, and may include, for example, a gas range, a microwave range, an oven, and the like. For convenience of description, the following description will be made in relation to an oven 1 as an example of a cooking apparatus according to the disclosed embodiment.

Figure 1:
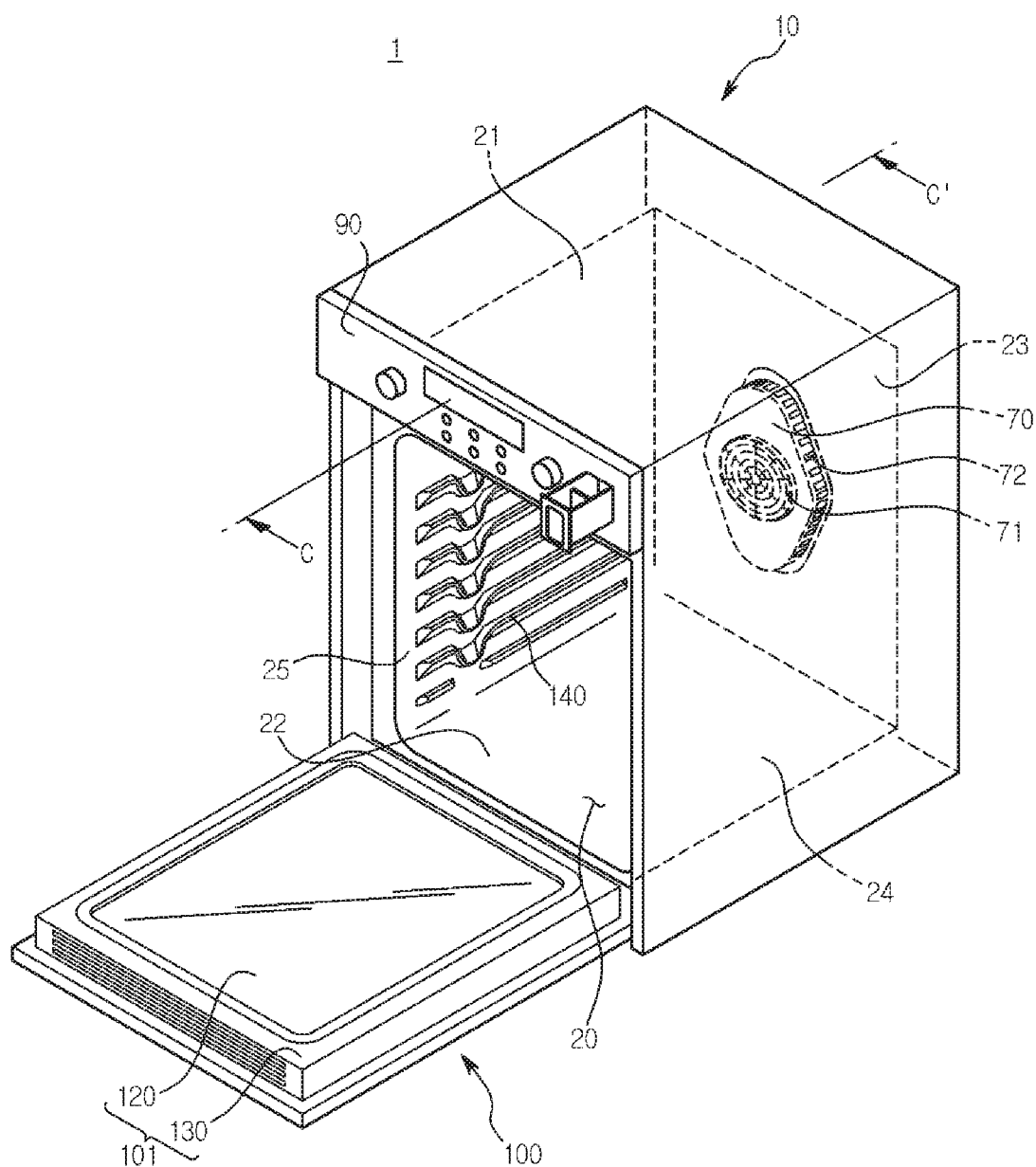
FIG. 1 is a perspective view illustrating the external appearance of a cooking apparatus according to an embodiment of the disclosure.
Figure 2:
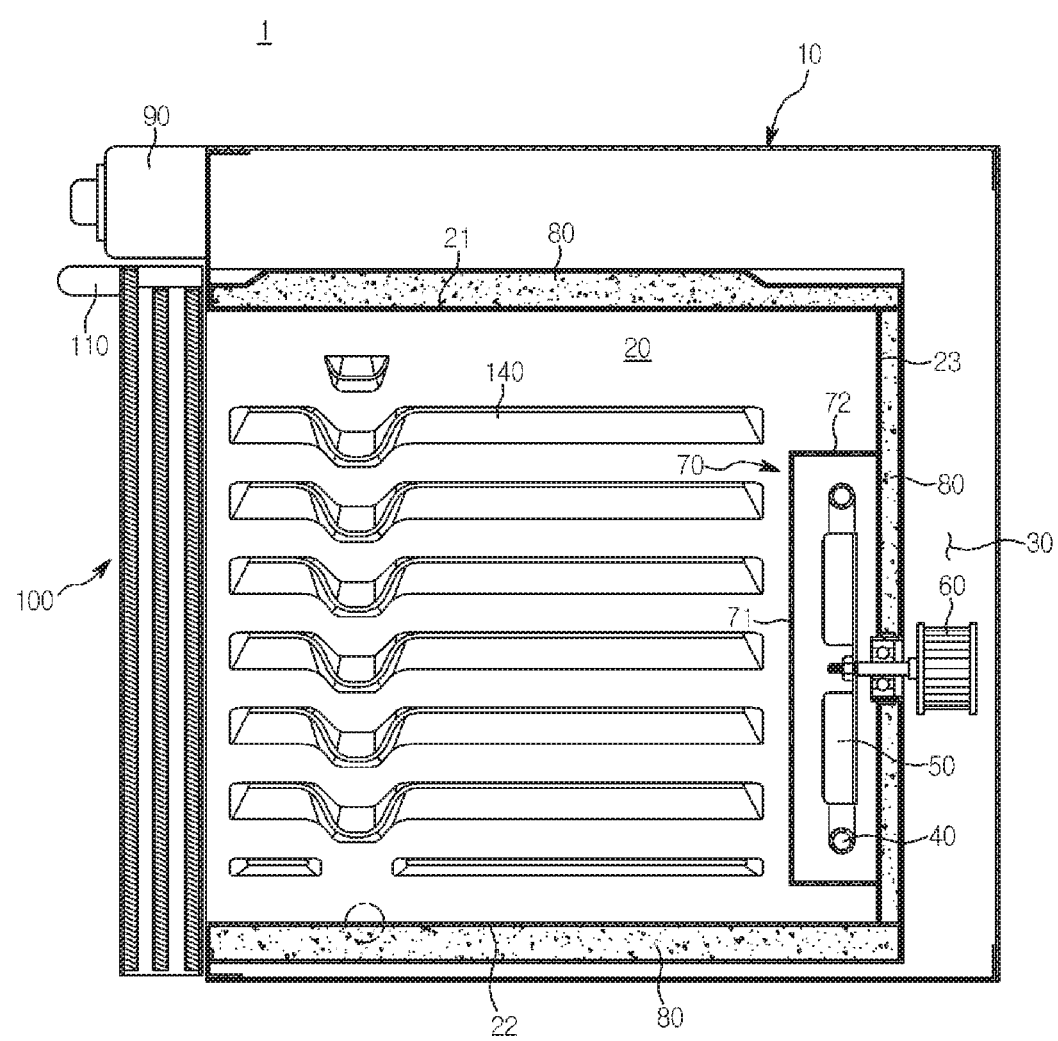
FIG. 2 is a cross-sectional view of an oven taken along line C-C' in FIG. 1 according to an embodiment of the disclosure.

FIG. 1 is a perspective view illustrating the external appearance of an oven 1 according to an embodiment of the disclosure. FIG. 2 is a cross-sectional view of the oven 1 taken along line C-C' in FIG. 1 according to an embodiment of the disclosure.

Referring to FIGS. 1 and 2, an oven 1 may include a main body 10. The main body 10 may form the external appearance of the oven 1.

The oven 1 may further include a cooking compartment 20. The cooking compartment 20 may be provided inside the main body 10. The cooking compartment 20 may have a front side open. In other words, the front side of the cooking compartment 20 may be opened.

The cooking compartment 20 may include an upper side 21, a lower side 22, a rear side 23, a right side 24, and a left side 25.

The oven 1 may further include an electric unit 30. The electric unit 30 may be provided behind the cooking compartment 20. In other words, the electric unit 30 may be formed in a space provided between the cooking compartment 20 and the main body 10. Electrical components for performing various functions of the oven 1 may be disposed in the electric unit 30.

The oven 1 may further include a convection heater 40 provided to heat the cooking compartment 20. The convection heater 40 may be installed on the rear side 23 of the cooking compartment 20.

The oven 1 may further include a convection fan 50 provided to supply the heat generated by the convection heater 40 to the interior of the cooking compartment 20. The convection fan 50 may be installed on the rear side 23 of the cooking compartment 20 such that heat generated by the convection heater 40 may circulate inside the cooking compartment 20.

The oven 1 may further include a fan drive motor 60. The fan drive motor 60 may be connected to the convection fan 50 to transmit the driving force to the convection fan 50.

The oven 1 may further include a cover case 70. The convection heater 40 and the convection fan 50 may be accommodated in the cover case 70. The cover case 70 may be fixedly coupled to the rear side of the cooking compartment 20. The cover case 70 may include a suction port 71 and a discharge port 72. The suction port 71 may be formed at the center of the front side of the cover case 70 to correspond to the convection fan 50. The discharge port 72 may be formed along the lateral side of the cover case 70.

However, the positions of the suction port 71 and the discharge port 72 may be variously implemented without being limited thereto.

During operation of the oven 1, air inside the cooking compartment 20 is introduced into the cover case 70 through the suction port 71 of the cover case 70 by the rotation of the convection fan 50. The air introduced into the cover case 70 is heated by the convection heater 40 and the heated air is discharged into the cooking compartment 20 through the discharge port 72 of the cover case 70. The heated air discharged into the cooking compartment 20 circulates in the cooking compartment 20 and heats the cooking object.

The oven 1 may further include a heat insulating member 80. The heat insulating member 80 may be disposed at an outside of the cooking compartment 20 to block heat exchange between the cooking compartment 20 and the outside.

The oven 1 may further include a control panel 90. The control panel 90 may be installed at an upper portion of the main body 10 for the user to control the operation of the oven 1.

The oven 1 may further include a door 100 rotatably installed on the main body 10 to open and close the cooking compartment 20. The door 100 may be coupled to the main body 10 to form the external appearance of the front side of the oven 1. The door 100 may be provided with a door handle 110 that facilitates opening and closing of the door 100.

The door 100 may include a door inner surface 101 facing the cooking compartment 20 and a door outer surface facing the outside. The door handle 110 may be provided on the door outer surface.

The door 100 may further include a door glass 120 and a door frame 130. The door frame 130 may be provided to support the door glass 120. One surface of the door glass 120 and one surface of the door frame 130 may form the door inner surface 101.

The oven 1 may further include a shelf or rack (not shown). The shelf may be arranged to be withdrawn inside the cooking compartment 20 so that the cooking object may be placed on the shelf.

The oven 1 may further include a support member 140 provided to support the shelf. The support member 140 may be formed on the right side 24 and the left side 25 of the cooking compartment 20.

The cooking compartment 20 may be easily be contaminated by combustion oxides, oil mist, or the like generated during the cooking process of the cooking object. When the combustion oxides, oil mist, and the like remain for a long time, the inner surface of the cooking compartment 20 may be damaged. In addition, the combustion oxides, oil mist, and the like may cause bacterial propagation and odor generation, and thus exert a hazardous influence on users.

Accordingly, the cooking compartment 20 needs to be kept clean. Methods of cleaning the contaminated cooking compartment 20 may include a pyro-cleaning and a steam cleaning.

The pyro-cleaning is a method of removing contaminants attached to the inner surface of the cooking compartment 20 by burning, and the steam cleaning is a method of removing the contaminants attached to the inner surface of the cooking compartment 20 by hydration. The pyro-cleaning is used based on the fact that the pollution formed into ashes through combustion is relatively easily removed, but the pyro-cleaning requires a long period time of high-temperature heating to burn contaminants, and a large amount of noxious gas or sooty smoke may be generated in the process of burning the contaminants.

The steam cleaning requires a short period of time compared to the pyro-cleaning, and produces no harmful gas or sooty smoke, but the steam cleaning has difficulty in removing contaminants strongly attached to the inner surface of the cooking compartment 20. The disclosed embodiment provides the oven 1 employing an enamel coating layer 300 that removes the above described limitations of the pyro-cleaning and steam cleaning. Hereinafter, the enamel coating layer according to the disclosed embodiments will be described in detail.

Figure 3:
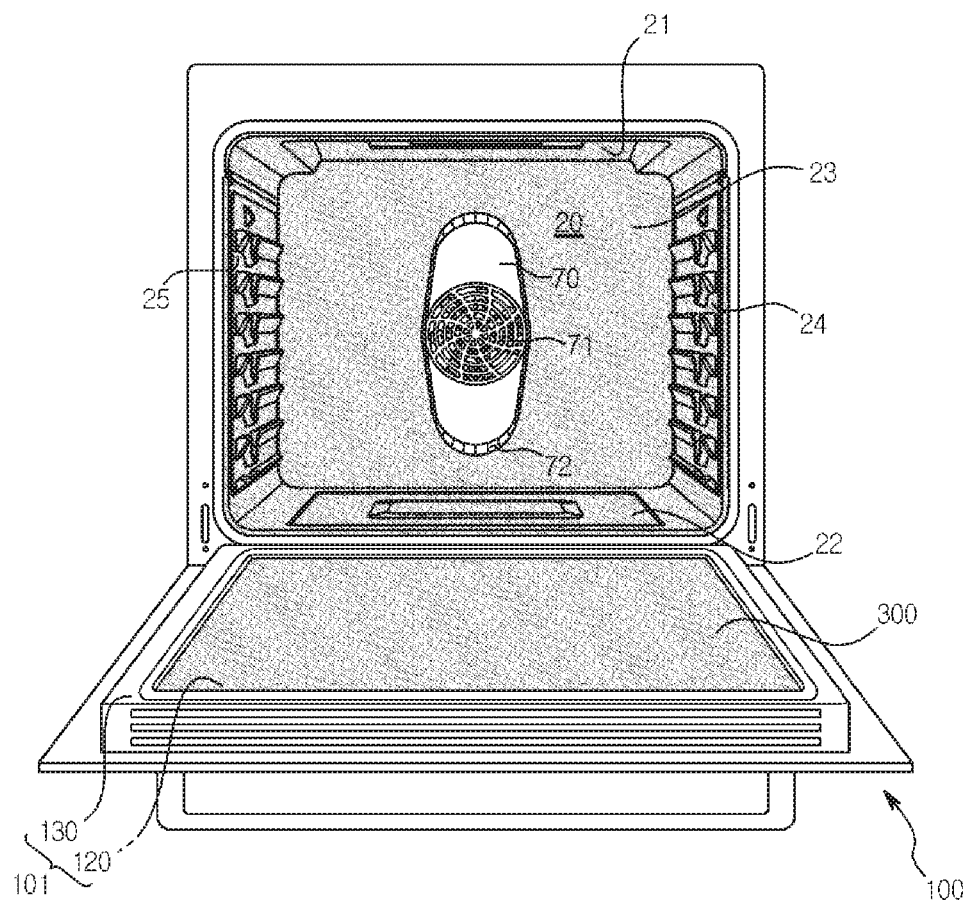
FIG. 3 is a view illustrating a cooking apparatus including an enamel coating layer according to an embodiment of the disclosure.

FIG. 3 is a view illustrating an oven employing the enamel coating layer 300 according to an embodiment of the disclosure, which shows the cooking compartment 20 and the door 100. For the sake of convenience in description, the door 100 is illustrated as being coupled to the cooking compartment 20. The enamel coasting layer 300 is formed by coating an inner surface of the cooking compartment 20 or a rear surface of the door 100 with an enamel composition.

Referring to FIG. 3, the enamel coating layer 300 is formed on the surface of the cooking compartment 20, using an enamel composition including, in percent (%) by weight of the entire composition, 5% or less (excluding 0%) of a silicon dioxide ($SiO_2$), 10% to 20% of an aluminum oxide ($Al_2O_3$), 10% to 20% of a phosphorous pentoxide ($P_2O_5$), 5% to 15% of a rare earth oxide, and 5% to 10% of a ferric oxide ($Fe_2O_3$).

$SiO_2$ is a basis component of the enamel composition. $SiO_2$ serves to form a vitreous enamel coating layer, and has an excellent chemical resistance, without reacting with an acidic or basic solution. In addition, $SiO_2$ has an excellent heat resistance and has a low expansion rate at a high temperature. The enamel composition may further include $B_2O_3$ in addition to the components described above. $B_2O_3$ increases the vitrification area of the enamel composition, and properly adjusts the thermal expansion coefficient of the enamel composition such that the enamel coating layer is firmly welded without being delaminated.

The $SiO_2$ content according to the disclosure is 5% or less (excluding 0%), which is lower than a $SiO_2$ content of a general enamel composition.

A general enamel composition contains 30% to 70% of $SiO_2$ that serves as a network former, thereby including a relatively large amount of surface oxide (M-O) groups. The surface oxide groups form a hydrogen bond with a hydroxy (R—OH) group of contaminations generated during cooking. In order to break the hydrogen bonds, which is stronger than other intermolecular binding, a great energy is required. Accordingly, the contaminants on the general enamel are not easily removed.

According to the disclosed embodiment, the content serving as a network former is replaced with $Al_2O_3$ and $P_2O_5$ having a high ratio of Non-bridging oxygen, while reducing the $SiO_2$ content to 5% or less.

$Al_2O_3$ and $P_2O_5$ form an aluminophosphate structure during melting. The aluminophosphate structure contains a large amount of non-bridging oxygen compared to a general borosilicate structure. As the amount of non-bridging oxygen increases, the degree of network freedom inside the enamel increases, and thus the amount of polar oxide groups on the surface of the enamel decreases.

$Al_2O_3$ and $P_2O_5$ serve as a main network former. When the contents of $Al_2O_3$ and $P_2O_5$ are excessively high, the adhesion with a base metal is significantly lowered, and the upper limit of the contents of $Al_2O_3$ and $P_2O_5$ is set to 20%. However, when the contents are significantly low, the oxide concentration on the surface increases, which facilitates the binding with contaminations. Accordingly, the lower limit of the contents of $Al_2O_3$ and $P_2O_5$ is set to 10%.

In addition, an $Al_2O_3$-to-$P_2O_5$ ratio needs to be maintained in a range of 0.5 to 1:1 to form the most efficient network structure. Outside of the range, a large amount of unbound Al-oxides or P-oxides are produced due to a failure to form aluminophosphate structures in the network structure, which weakens the network structure.

However, when the main network former is formed by only $Al_2O_3$ and $P_2O_5$, the adhesion between the enamel coating layer and the base metal may be deteriorated due to the influence of the structure with a high degree of freedom.

In order to improve the adhesion between the base metal and the enamel coating layer, a surface treatment may be performed to increase the roughness of the surface of the base metal or a binder including at least one selected from the group consisting of a nickel oxide (NiO), a cobalt oxide (CoO), a copper oxide (CuO), and a ferric oxide ($Fe_2O_3$) may be used. In general, the disclosure is characterized in that not only the generally known binder NiO and CoO but also $Fe_2O_3$ may be used as a binder.

Since $Al_2O_3$ and $P_2O_5$ added in place of $SiO_2$ inhibit an oxidation reaction with base metals of NiO and CoO, the adhesion of the base metal with a coating may be deteriorated. According to the disclosure, $Fe_2O_3$ is added to prevent an oxidation-reduction reaction of $Al_2O_3$ and $P_2O_5$ and assist an oxidation-reduction reaction of NiO and CoO, and an oxidation-reduction reaction caused by $Fe_2O_3$ itself with respect to the Fe component included in the substrate prevents the adhesion of the coating with the base material from being deteriorated.

In an implementation, the content of $Fe_2O_3$ may be added in a ferric oxide ($Fe_2O_3$)-to-an aluminum oxide ($Al_2O_3$) ratio of 0.5 to 1:1, in consideration of the cleaning efficiency and the adhesion. In detail, the $Fe_2O_3$ content may be 5% to 10% of the coating.

With the enamel composition according to the disclosure in which the network is mainly formed of $Al_2O_3$ and $P_2O_5$ with a less content of $SiO_2$, a large amount/number of pores are formed inside the enamel coated surface, and air bubbles escape during firing, making the coating surface rough. When contaminants are penetrated into the rough surface and adsorbed, the contaminants are not easily removed.

In order to prevent such a difficulty, a rare earth oxide, MgO, and $TiO_2$ among metal oxides having a low electronegativity may be added to a network composed of $Al_2O_3$ and $P_2O_5$ as an intermediate.

The added rare earth oxide, MgO, and $TiO_2$ share oxygen with the aluminophosphate structure network, thereby making the network structure denser and reducing the polar oxide groups present on the surface. As a result, the phenomenon of air bubbles escaping from the network structure during firing is reduced so that the physical stability is improved and the surface roughness of the enamel coating layer is lowered, thereby improving the cleaning efficiency.

The rare earth oxide may include at least one selected from the group consisting of a cerium oxide ($CeO_2$), a lanthanum oxide ($La_2O_3$), and a samarium oxide ($Sm_2O_3$). The respective components of $CeO_2$), $La_2O_3$, and $Sm_2O_3$ have different melting temperatures and form different structures together with the aluminophosphate during melting, which causes different influences on the surface roughness.

The content of the rare earth oxide may be added in a rare earth oxide-to-$P_2O_5$ ratio of 0.3 to 1:1 in consideration of both the degree of freedom of the network and the surface roughness. When the content of the added rare earth oxide is excessively high, the manufacturing cost increases, and rapid crystallization is caused thereby increasing the surface roughness. Accordingly, the upper limit of the rare earth oxide content is set to 15%. However, when the content of the added rare earth oxide is excessively low, the cleaning efficiency is lowered as the cleaning cycle is increased. Accordingly, the lower limit of the rare earth oxide content is set to 5%.

In addition, the enamel composition according to the disclosed embodiment may include the following components.

A tin oxide (SnO) is a highly stable inorganic substance and serves to increase the chemical resistance of glass by uniformly melting the components constituting a glass.

A zirconium dioxide ($ZrO_2$) has an excellent resistance to abrasion and heat, and has a low thermal expansion coefficient at a high temperature. SnO and $ZrO_2$ prevent alkali ions from moving, such that the specific resistance is increased, improving the adhesion of the enamel coating.

A titanium dioxide ($TiO_2$) is not eroded by various inorganic acids, organic acids, alkalis, gases and the like at a high temperature, and is not dissolved at a temperature of 1800° C. or below. The above described $Al_2O_3$, $ZrO_2$, and $TiO_2$ may be combined to improve the heat resistance of the enamel coating layer. The enamel composition according to the disclosed embodiment may form a coating layer not deformed even at a high temperature, with a glass transition temperature in a range of about 520 V to about 700° C.

An alkali metal oxide and an alkaline earth metal oxide have a low viscosity and thus improve the fluidity of the enamel composition. However, when the content of the alkali metal oxide and the alkaline earth metal oxide is excessively high, the acid resistance is deteriorated and excessive negative charges are generated in the coating. Accordingly, a proper component control is required.

The alkali metal oxide may be selected from the group consisting of a lithium oxide ($Li_2O$), a sodium oxide ($Na_2O$), and a potassium oxide ($K_2O$), and the alkaline earth metal oxide may be selected from the group consisting of a calcium oxide (CaO) and a magnesium oxide (MgO).

Figure 4:
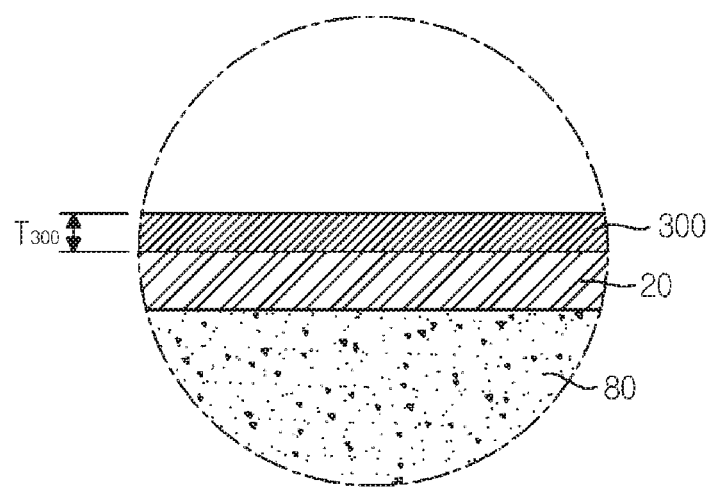
FIG. 4 is an enlarged cross-sectional view of a part of an inner surface of the cooking compartment shown in FIG. 2 according to an embodiment of the disclosure.

FIG. 4 is an enlarged cross-sectional view of a part of the inner surface of the cooking compartment according to an embodiment of the disclosure.

Figure 6:
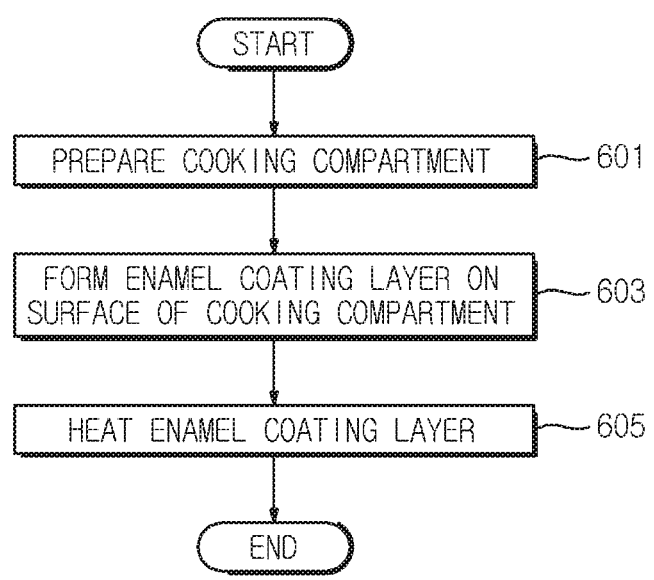
FIGS. 6, 7, 8, 9, and 10 are flowcharts showing a process of forming an enamel coating layer according to various embodiments of the disclosure.

FIG. 6 is a flowchart showing a process of forming the enamel coating layer 300 according to an embodiment of the disclosure.

Referring to FIGS. 4 and 6, a method of manufacturing a cooking apparatus according to the disclosed embodiment includes preparing a cooking compartment (at operation 601), preparing or forming an enamel coating layer on a surface of the cooking compartment (at operation 603), wherein the enamel coating layer includes, in percent (%) by weight of the entire composition, 5% or less (excluding 0%) of a silicon dioxide ($SiO_2$), 10% to 20% of an aluminum oxide ($Al_2O_3$), 10% to 20% of a phosphorous pentoxide ($P_2O_5$), 10% to 15% of a rare earth oxide, and 5% to 10% of a ferric oxide ($Fe_2O_3$). and heating the cooking compartment provided with the enamel coating layer at a temperature of 800° C. to 1000° C. (at operation 605).

The cooking compartment may be manufactured using a base metal, such as iron, cast iron, or an iron alloy. The base metal is not limited to the above-mentioned examples.

The preparing of the enamel coating layer includes preparing enamel paint powder and applying the enamel coating powder to the surface of the cooking compartment.

The preparing of the enamel paint powder may include preparing an enamel frit and mixing an additive into the enamel frit for powder coating.

The enamel frit is prepared by mixing the above-described enamel composition and then melting the mixed enamel composition. In detail, the melting process is performed for about one to two hours at a temperature of about 1300° C. to about 1600° C.

Thereafter, the melted enamel frit is quenched using distilled water or a chiller. The component contents of the enamel frit obtained after the quenching have the same ratio as that of the enamel composition.

Thereafter, the enamel frit is dispersed in a solvent, such as acetone and the like, to be dried, and is filtered through a mesh. In this case, the frit to be filtered out has a diameter of 50 µm or less.

After the preparing of the enamel frit, a final enamel paint powder is prepared by adding an electrostatic additive and a heat resistant additive for powder coating to the prepared enamel frit.

The prepared enamel paint powder is applied to the surface of the base metal through a powder coating method. In detail, the powder coating method includes an electrostatic spraying method, a fluidized bed method, an electrostatic fluidized bed method, a thermal coasting spray method, and the like.

The base metal coated with the enamel paint powder is subject to firing to be dried at a temperature of 800° C. to 1,000° C. for about 100 seconds to 400 seconds, so that a final enamel coating layer is formed.

Figure 7:
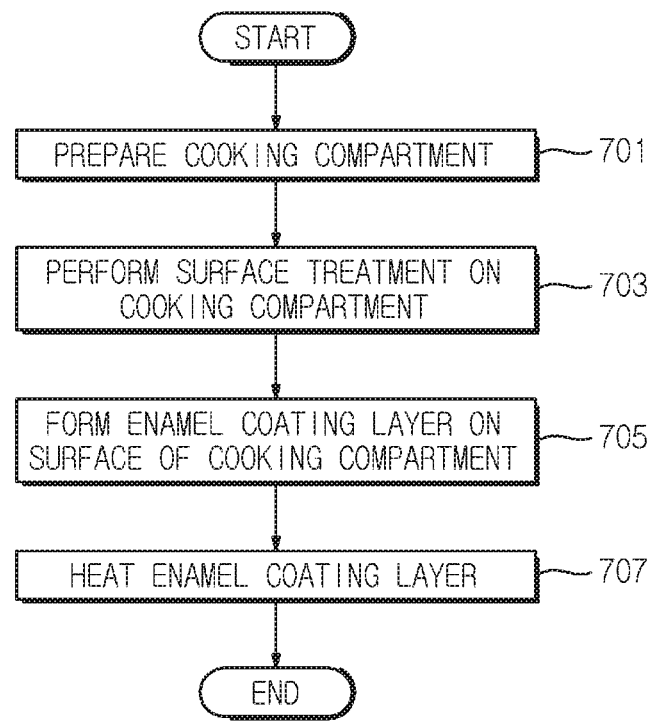

FIG. 7 is a flowchart showing a process of forming the enamel coating layer 300 according to an embodiment of the disclosure (as shown in operations 701, 703, 705, and 707).

Referring to FIG. 7, the disclosed embodiment is provided to improve the adhesion of the enamel coating layer through the surface treatment of the base metal.

In detail, a surface treatment is performed on the base metal (at operation 703) before the base metal is coated with the enamel powder or wet paint (at operation 705), so that the roughness of the surface of the substrate is increased. The surface treatment removes foreign substances, such as rust, oil and the like, attached to the surface of the base metal and makes the surface roughness of the base metal constant, so that the adhesion of the enamel coating layer is improved.

The surface treatment method is not limited as long as it is a cleaning method commonly used in the field which the disclosure belongs to. The examples of the surface treatment include a sand blast method, an etching method, and the like. The sandblast is a method of removing oxide scales or rust by spraying sand, such as silica sand, onto the surface of an object with high pressure air or using an impeller (a wing car) rotating at a high speed. The etching of the surface of the substrate is performed through a nitric acid treatment. Specifically, the nitric acid may have a concentration of 20 g/L to 300 g/L, and the treatment time of the etching may be determined inversely proportional to the concentration of the nitric acid.

In addition, the disclosed embodiment is provided to improve the adhesion of the enamel coating layer by forming a phosphate film on the surface of the base metal. In detail, the phosphate film is formed on the surface of the base metal through a zinc phosphate-based treatment, a manganese phosphate-based treatment or an iron phosphate-based treatment, so as to improve corrosion resistance as well as the adhesion of the enamel coating layer.

The disclosure uses a manganese phosphate-based treatment, different from the conventional general enamel film, catalyst enamel film, and pyrolitic enamel a zinc phosphate film in which a zinc phosphate-based treatment is used. The use of a manganese phosphate-based treatment may reduce side reactions in the formation of the film when compared to using a zinc phosphate-based type, so that a uniform and high surface roughness may be provided. Since the manganese phosphate-based treatment requires a film made of dense fine particles, and allows a thick film coating, thereby improve the abrasion resistance.

Figure 5:
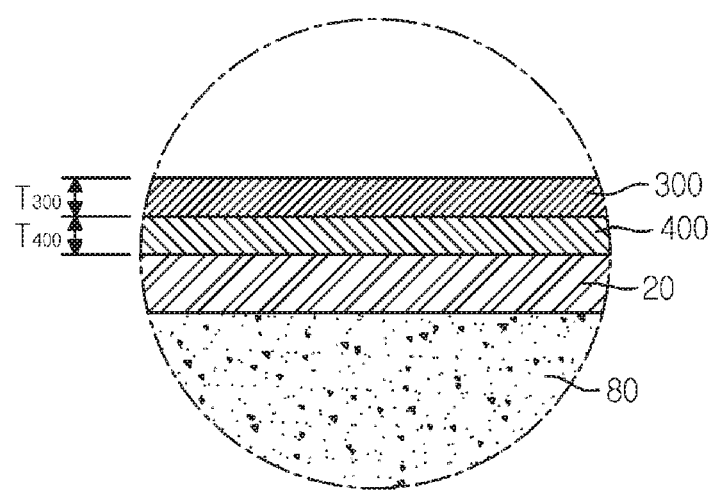
FIG. 5 is an enlarged cross-sectional view of a part of an inner surface of the cooking compartment shown in FIG. 2 according to an embodiment of the disclosure.

FIG. 5 is an enlarged cross-sectional view of a part of an inner surface of the cooking compartment according to an embodiment of the disclosure.

Referring to FIG. 5, according to the disclosed embodiment, an intermediate coating layer 400 is prepared on the surface of the base metal to improve the adhesion of the enamel coating layer 300. The intermediate coating layer 400 may be formed using a borosilicate-based enamel having a high adhesion to the base metal as a base coat, and the enamel coating layer 300 according to the disclosure may be formed on the intermediate coating layer 400.

In detail, the intermediate coating layer 400 may be formed by using a borosilicate-based enamel including a silicon dioxide ($SiO_2$) and a boron trioxide $B_2O_3$ in a total content of 10% or more and 80% or less by weight, as a base coat. When the contents of $SiO_2$ and $B_2O_3$ are excessively high, cracks may occur in the coating due to a change in enamel thermal expansion characteristics, or the coating may be delaminated from the substrate. Accordingly, the upper limit of the total content of $SiO_2$ and $B_2O_3$ may be set to 80%.

Figure 8:
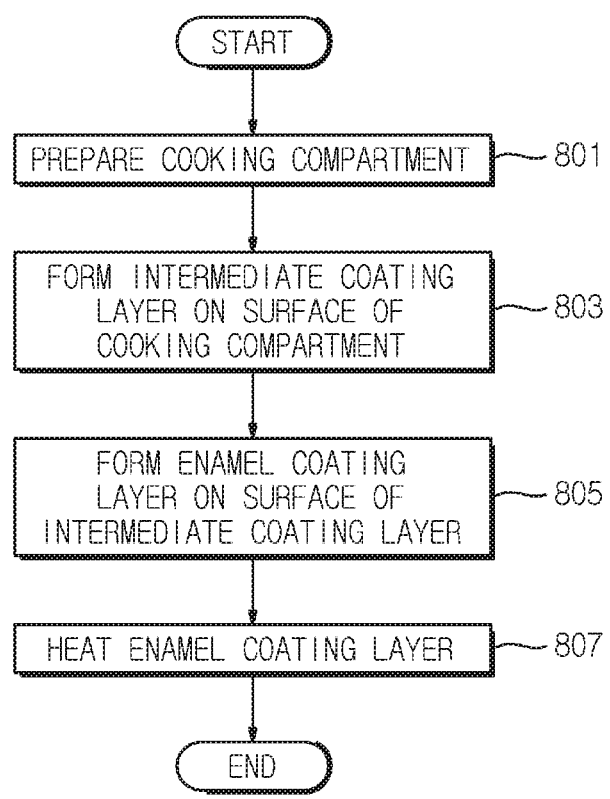

FIG. 8 is a flowchart showing a process of forming the enamel coating layer 300 according to an embodiment of the disclosure (as shown by operations 801, 803, 805, and 807).

Referring to FIG. 8, the enamel coating layer 300 according to the disclosed embodiment may be prepared by coating a boron silicate based enamel base coat on a surface of a base metal with a spray or dipping method to provide or form the intermediate coating layer 400 (at operation 803), applying or forming the enamel paint powder according to the disclosure on the intermediate coating layer 400 (at operation 805), and then performing firing at a temperature of 800° C. to 1,000° C. for 100 seconds to 400 seconds at least once (at operation 807).

Figure 9:
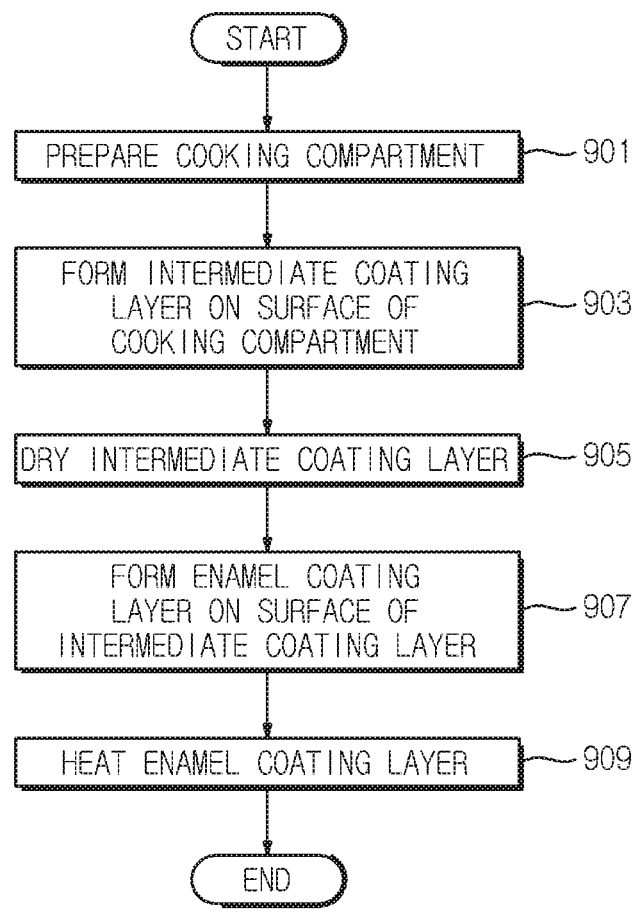

FIG. 9 is a flowchart showing a process of forming the enamel coating layer 300 according to an embodiment of the disclosure (as shown by operations 901, 903, 905, 907, and 909).

Referring to FIG. 9, the enamel coating layer 300 according to the disclosed embodiment may be prepared or formed (at operation 903) by coating a boron silicate based enamel base coat on a surface of a base metal with a spray or dipping method and drying the base coat (at operation 905) by natural drying or hot air drying to provide or form the intermediate coating layer 400 (at operation 907), applying the enamel paint powder according to the disclosure on the intermediate coating layer 400, and then performing firing at a temperature of 800° C. to 1,000° C. for 100 seconds to 400 seconds at least once (at operation 909).

Figure 10:
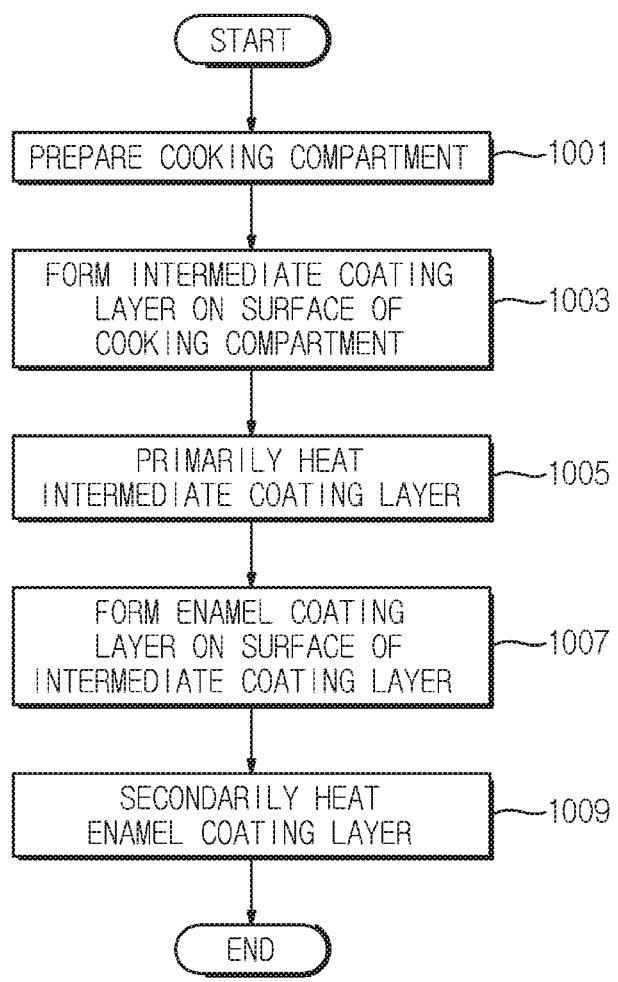

FIG. 10 is a flowchart showing a process of forming the enamel coating layer 300 according to an embodiment of the disclosure (as shown by operations 1001, 1003, 1005, 1007, and 1009).

The enamel coating layer 300 according to the disclosed embodiment may be prepared or formed by coating a boron silicate based enamel base coat on a surface on a base metal with a spray or dipping method (at operation 1003) and performing a primary firing (at operation 1005) at a temperature of 800° C. to 900° C. to provide the intermediate coating layer 400, applying or forming the enamel paint powder according to the disclosure on the intermediate coating layer 400 (at operation 1007), and then performing a secondary firing at a temperature of 800° C. to 1,000° C. for 100 seconds to 400 seconds (at operation 1009).

At this time, the temperature for firing the enamel cover coat may be lower than the temperature for firing the enamel ground coat by about 0° C. to 40° C. The firing performed in a range between the melting point of the intermediate coating layer 400 and the melting point of the enamel coating layer 300 may allow complete bonding between the intermediate coating layer 400 formed of enamel base coat and the enamel coating layer 300 formed of enamel cover coat.

In addition, when the primary firing is performed at a temperature lower than 800° C., the intermediate coating layer 400 may not be attached to the surface of the molded article, and when the primary firing is performed at a temperature higher than 900° C., the intermediate coating layer 400 may be oxidized due to the high temperature.

smoothness of the enamel coating layer 300 is lowered, and the coating layer is cracked or delaminated from the substrate.

The cooking apparatus manufactured by the above-described manufacturing method has a stain resistance improved by the enamel coating layer 300, so that the inner surface of the cooking compartment 20 and the rear surface of the door 100 are prevented from being contaminated by organic materials, and easy cleaning is ensured.

Hereinafter, the disclosure will be described in more detail with reference to the embodiments and comparative examples.

Enamel paint powders were prepared according to the compositions shown in the following Table 1, and are applied to enamel steel sheets using an electrostatic powder sprayer, and then the enamel steel sheets are introduced into a firing furnace and fired at a temperature of 840° C. for 4 minutes. After the firing, the steel sheets are cooled to the room temperature by natural cooling, so that specimens provided with the enamel coating layers are prepared.

TABLE 1

| | Embodiment 1 | Embodiment 2 | Embodiment 3 | Embodiment 4 | Comparative example 1 | Comparative example 2 | Comparative example 3 |
|---|---|---|---|---|---|---|---|
| $SiO_2$ | 5 | 4 | 3 | 4 | 53.6 | 4 | 2.5 |
| $B_2O_3$ | 7 | 8 | 5 | 8 | 11.5 | 11 | 8 |
| $Al_2O_3$ | 15 | 14 | 15 | 14 | 1 | 20 | 21 |
| $P_2O_5$ | 14 | 14 | 20 | 15 | — | 20 | 19 |
| $Fe_2O_3$ | 5 | 5 | 5 | 5 | — | — | — |
| $TiO_2$ | 1 | — | — | 1 | 3.5 | 2 | 2 |
| MgO | 1 | 2 | — | 1 | — | 1 | — |
| $Li_2O$ | 8 | 8 | 8 | 8 | 6 | 8 | 8 |
| $Na_2O$ | 12 | 12 | 12 | 10 | 7 | 10 | 11 |
| $K_2O$ | 6 | 3 | 6 | 6 | 0.5 | 5 | 6 |
| CaO | 5 | 6 | 2 | 4 | 1.5 | 6 | 2 |
| $CeO_2$ | 15 | 14 | 14 | 14 | 1 | 3 | 10 |
| CoO | 3 | 6 | 6 | 6 | 3.5 | 4 | 6 |
| NiO | 1 | 1 | 1 | 1 | 3.5 | 2 | 2 |
| SnO | — | — | — | — | — | 1 | 1 |
| CuO | 1 | 1 | 1 | 1 | 2.4 | 1 | 1 |
| $ZrO_2$ | 1 | 1 | 1 | 1 | 3.5 | 1 | — |
| $MnO_2$ | — | 1 | 1 | 1 | 1.5 | 1 | 0.5 |

The thickness ($T_{400}$) of the intermediate coating layer is not limited, but in an implementation, the thickness of the intermediate layer may be 50 μm to 150 μm. When the thickness ($T_{400}$) of the intermediate coating layer is less than 50 μm, a discoloration may occur in the firing process, and physical properties, such as durability, abrasion resistance, and corrosion resistance of the coating layer, may deteriorate. When the thickness of the intermediate coating layer is greater than 150 μm, the surface smoothness of the enamel coating layer after firing may be lowered.

In an implementation, the thickness ($T_{300}$) of the enamel coating layer may be 50 μm to 300 μm. When the thickness ($T_{300}$) of the enamel coating layer is less than 50 μm, a discoloration may occur in the firing process, and when the thickness of the enamel coating layer is greater than 300 μm, a crack may occur in the coating after firing, or the coating may be delaminated from the substrate.

In an implementation, the thickness ($T_{400}$) of the intermediate coating layer may be less than the thickness ($T_{300}$) of the enamel coating layer. That is because the intermediate coating layer 400 provided at a lower side has a greater influence on the entire coating layer, and when the intermediate coating layer 400 is excessively thick, the surface Then, the cleaning efficiency, the heat resistance, the adhesion, and the surface of the specimen were evaluated according to a predetermined test method.

Cleaning Efficiency Evaluation Method

The cleaning efficiency evaluation was performed by applying a thin layer of chicken oil 4.3 mg/cm2 as a contaminant on the surface of the specimen, and then heating the specimen at 250° C. for 3 hours to fix the contaminant. Thereafter, the specimen was steamed for 20 minutes and was mounted on an abrasion tester. A wet towel was installed on a rubber having a diameter of 60 mm to wipe the hardened chicken oil by reciprocating 5 times at a load of 2 kgf. The scores of 1 to 5 were given based on the degree of cleaning, and the evaluation standards are as follows:

(1) Cleaned very well (cleaned area: 90% or more);
(2) Cleaned well (cleaned area: 70% to 90%);
(3) Cleaned but with difficulty (cleaned area: 50% to 70%);
(4) Not cleaned well (cleaned area 30% to 50%); and
(5) Not cleaned by steam (cleaned area: 30% or less).

Heat Resistance Evaluation Method

The heat resistance evaluation was performed by heating the specimen at 250° C. for 30 minutes and then quenching the specimen in water at the room temperature to observe the surface state (crack, delamination, thermal deformation), and the scores of 1 to 5 were given based on the surface state. The evaluation standards are as follows:
(1) No crack, delamination, or deformation on the surface after 3 cycles;
(2) Partial delamination after 3 cycles;
(3) No crack, delamination, or deformation on the surface after 2 cycles
(4) Partial delamination after 2 cycles; and
(5) Crack, delamination, deformation on the surface after 1 cycle.

Adhesion Evaluation Method

The adhesion evaluation was performed by dropping a steel ball having a load of 2.0 kg onto the specimen at a height of 25 cm, and observing the specimen with naked eyes, and the scores of 1 to 5 were given based on the degree to which an impact portion of the substrate was exposed. The evaluation standards are as follows:
(1) Substrate exposure of 30% or less;
(2) Substrate exposure of 40% or less;
(3) Substrate exposure of 50% or less;
(4) Substrate exposure of 60% or more; and
(5) Substrate exposure of 70% or more.

Surface Evaluation Method

The surface evaluation was performed by observing the surface of the specimen with naked eyes, and measuring the roughness. The scores of 1 to 5 were given based on the measurement, and the evaluation standards are as follows:
(1) No pinhole, blaster, etc. on the surface, and Ra (arithmetical average roughness) less than 1 μm;
(2) No pinhole, blaster, etc. on the surface, and Ra less than 3 μm;
(3) A pinhole or blaster on the surface, but Ra less than 3 μm;
(4) A pinhole or blaster on the surface, and Ra of 3 μm or greater; and
(5) Pinholes or blasters on the surface.

The evaluation results are shown in Table 2 below.

TABLE 2

|  | Embodiment 1 | Embodiment 2 | Embodiment 3 | Embodiment 4 | comparative example 1 | comparative example 2 | comparative example 3 |
|---|---|---|---|---|---|---|---|
| Cleaning efficiency | 1 | 1 | 1 | 1 | 5 | 2 | 1 |
| Heat resistance | 1 | 1 | 1 | 1 | 1 | 3 | 5 |
| Adhesion | 2 | 2 | 2 | 2 | 1 | 3 | 5 |
| Surface | 1 | 1 | 2 | 2 | 1 | 3 | 3 |

Referring to Table 1, examples 1 to 4 satisfy the composition of the enamel coating layer according to an embodiment of the disclosure. On the other hand, comparative example 1 shows a composition of a general borosilicate-based enamel, comparative example 2 has a $Fe_2O_3$ content and a rare earth oxide content deviating from the composition of the enamel coating layer, and comparative example 3 has a $Fe_2O_3$ content deviating from the composition of the enamel coating layer.

Referring to Table 2, the enamel composition according to the disclosure may secure physico-chemical stability, such as adhesion and heat resistance, required for enamel for a cooking apparatus.

In addition, the enamel composition according to the disclosure, in which $Al_2O_3$ and $P_2O_5$ are used as main network formers and rare earth oxides and $Fe_2O_3$ are added, has an excellent cleaning efficiency, so that contaminants attached the cooking apparatus are easily removed by water or steam.

As described above, $Al_2O_3$ and $P_2O_5$ are used as a main network former, so that the degree of network freedom is increased and generation of polar oxide groups on the surface is reduced. In addition, it can be seen that ease of cleaning is improved by adding a rare earth oxide to ensure a physico-chemically stable coating surface.

As is apparent from the above, the cooking apparatus provided with an enamel coating layer can ensure easy cleaning and physicochemical-stability.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. A cooking apparatus comprising:
a cooking compartment configured to accommodate a cooking object;
a door configured to open and close the cooking compartment; and
an enamel coating layer provided on a surface of the cooking compartment,
wherein, the enamel coating layer comprises, in percent (%) by weight of the entire composition:
5% or less (excluding 0%) of a silicon dioxide ($SiO_2$),
10% to 20% of an aluminum oxide ($Al_2O_3$),
10% to 20% of a phosphorous pentoxide ($P_2O_5$),
5% to 15% of a rare earth oxide, and
5% to 10% of a ferric oxide ($Fe_2O_3$).

2. The cooking apparatus of claim 1, wherein the ratio of the aluminum oxide ($Al_2O_3$) to the phosphorous pentoxide ($P_2O_5$) is 0.5 to 1:1 by weight.

3. The cooking apparatus of claim 1, wherein the ratio of the ferric oxide ($Fe_2O_3$) to the aluminum oxide ($Al_2O_3$) is 0.5 to 1:1 by weight.

4. The cooking apparatus of claim 1, wherein the ratio of the rare earth oxide to the phosphorous pentoxide ($P_2O_5$) is 0.3 to 1:1 by weight.

5. The cooking apparatus of claim 1, wherein the rare earth oxide is selected from the group consisting of a cerium oxide ($CeO_2$), a lanthanum oxide ($La_2O_3$), and a samarium oxide ($Sm_2O_3$).

6. The cooking apparatus of claim 1, wherein the enamel coating layer further comprises a binder selected from the group consisting of a cobalt oxide (CoO), a nickel oxide (NiO), a tin oxide (SnO), and a copper oxide (CuO).

7. The cooking apparatus of claim 1, wherein the enamel coating layer further comprises at least one of an alkali metal oxide or an alkaline earth metal oxide.

8. The cooking apparatus of claim 1, further comprising:
an intermediate coating layer provided between the cooking compartment and the enamel coating layer,
wherein the intermediate coating layer comprises a silicon dioxide ($SiO_2$) and a boron trioxide ($B_2O_3$) in a total content of 10% or more and 80% or less by weight.

9. The cooking apparatus of claim 8, wherein the intermediate coating layer includes a thickness equal to or smaller than a thickness of the enamel coating layer.

10. A method of manufacturing a cooking apparatus, the method comprising:
preparing a cooking compartment;
forming an enamel coating layer on a surface of the cooking compartment; and
heating the cooking compartment having the enamel coating layer at a temperature of 800° C. to 1000° C.,
wherein the enamel coating layer comprises, in percent (%) by weight of the entire composition:
5% or less (excluding 0%) of a silicon dioxide ($SiO_2$),
10% to 20% of an aluminum oxide ($Al_2O_3$),
10% to 20% of a phosphorous pentoxide ($P_2O_5$),
5% to 15% of a rare earth oxide, and
5% to 10% of a ferric oxide ($Fe_2O_3$).

11. The method of claim 10, further comprising:
performing an etching process on the prepared cooking compartment.

12. The method of claim 11, wherein the performing of the etching process comprises performing an etching process on the prepared cooking compartment using nitric acid at a concentration of 20 g/L to 300 g/L.

13. The method of claim 10, further comprising:
performing a sand blast process on the prepared cooking compartment.

14. The method of claim 10, further comprising:
performing a manganese phosphate process on the prepared cooking compartment.

15. The method of claim 10, further comprising:
after the preparing of the cooking compartment, preparing an intermediate coating layer on a surface of the cooking compartment,
wherein the intermediate coating layer includes a silicon dioxide ($SiO_2$) and a boron trioxide ($B_2O_3$) in a total content of 10% or more and 80% or less by weight.

16. The method of claim 15, further comprising:
after the forming of the intermediate coating layer, drying the intermediate coating layer.

17. The method of claim 15, wherein the forming of the intermediate coating layer comprises forming the intermediate coating having a thickness equal or smaller than a thickness of the enamel coating layer.

18. The method of claim 15, further comprising:
after the forming of the intermediate coating layer, heating the intermediate coating layer at a temperature of 800° C. to 900° C.

19. The method of claim 18, wherein the forming of the intermediate coating layer comprises preparing the intermediate coating having a thickness equal or smaller than a thickness of the enamel coating layer.

20. An enamel composition comprising, in percent (%) by weight of the entire composition:
5% or less (excluding 0%) of a silicon dioxide ($SiO_2$);
10% to 20% of an aluminum oxide ($Al_2O_3$);
10% to 20% of a phosphorous pentoxide ($P_2O_5$);
5% to 15% of a rare earth oxide; and
5% to 10% of a ferric oxide ($Fe_2O_3$).

* * * * *